US010352791B2

(12) United States Patent
Yu et al.

(10) Patent No.: US 10,352,791 B2
(45) Date of Patent: Jul. 16, 2019

(54) FLEXIBLE STRAIN SENSORS

(71) Applicants: Tsinghua University, Beijing (CN); HON HAI PRECISION INDUSTRY CO., LTD., New Taipei (TW)

(72) Inventors: Yang Yu, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/638,507

(22) Filed: Jun. 30, 2017

(65) Prior Publication Data
US 2018/0045589 A1    Feb. 15, 2018

(30) Foreign Application Priority Data
Aug. 11, 2016  (CN) .......................... 2016 1 0656030

(51) Int. Cl.
  G01L 1/22    (2006.01)
(52) U.S. Cl.
  CPC .................... G01L 1/2287 (2013.01)
(58) Field of Classification Search
  CPC .................................................. G01L 1/2287
  See application file for complete search history.

(56) References Cited

U.S. PATENT DOCUMENTS

| 9,476,782 B2 * | 10/2016 | Suzuki | B82Y 30/00 |
| 2006/0283262 A1 * | 12/2006 | Smits | G01N 27/041 73/799 |
| 2008/0134961 A1 * | 6/2008 | Bao | B82Y 10/00 117/86 |
| 2011/0111202 A1 * | 5/2011 | Su | B82Y 30/00 428/312.6 |
| 2011/0147715 A1 * | 6/2011 | Rogers | B82Y 10/00 257/24 |
| 2011/0155713 A1 * | 6/2011 | Wang | H05B 3/84 219/203 |

(Continued)

FOREIGN PATENT DOCUMENTS

| JP | 2014038088 A | * | 2/2014 |
| TW | I441366 | | 6/2014 |
| TW | I478866 | | 4/2015 |

*Primary Examiner* — Jamel E Williams
(74) *Attorney, Agent, or Firm* — ScienBiziP, P.C.

(57) ABSTRACT

The present disclosure relates to a flexible strain sensor. The flexible strain sensor includes a composite structure, a first electrode, a second electrode and a detector. The composite structure includes a carbon nanotube film and a substrate combined with each other. The carbon nanotube film defines a desired deformation direction and includes a plurality of first carbon nanotubes oriented substantially perpendicular with the desired deformation direction. The plurality of first carbon nanotubes are joined end to end with each other along their orientation direction. The first electrode and the second electrode are separately located at two opposite ends of the carbon nanotube film and electrically coupled with the carbon nanotube film. The detector is electrically connected with the first electrode and the second electrode.

16 Claims, 6 Drawing Sheets

(56) References Cited

U.S. PATENT DOCUMENTS

| | | | |
|---|---|---|---|
| 2012/0052680 A1* | 3/2012 | Sakuma | H01L 21/76876 438/675 |
| 2013/0031987 A1* | 2/2013 | Beauvais | A61B 5/1038 73/774 |
| 2014/0144576 A1* | 5/2014 | Jiang | B32B 5/12 156/163 |
| 2014/0331793 A1* | 11/2014 | Suzuki | B82Y 30/00 73/862.629 |
| 2016/0338639 A1* | 11/2016 | Myers | A61B 5/6824 |

* cited by examiner

FLEXIBLE STRAIN SENSORS

CROSS-REFERENCE TO RELATED APPLICATIONS

This application claims all benefits accruing under 35 U.S.C. § 119 from China Patent Application No. 201610656030.7, filed on Aug. 11, 2016, in the China Intellectual Property Office, the contents of which are hereby incorporated by reference.

FIELD

The present disclosure relates to a flexible strain sensor.

BACKGROUND

Flexible strain sensors have attracted great attention due to the urgent demands from the increasing development of stretchable devices, including biomedical devices and wearable devices. Many sensing materials and structures have been developed as flexible strain sensors. Using conventional metal strain gauges as flexible strain sensors was limited by the metal gauge's tough mechanical properties and working range (<5% strain) compared to the strain to be measured in most situations for wearable devices.

What is needed, therefore, is a flexible strain sensor that can overcome the above disadvantages.

BRIEF DESCRIPTION OF THE DRAWINGS

Implementations of the present technology will now be described, by way of example, with reference to the attached figures, wherein.

DETAILED DESCRIPTION

Figure 1:
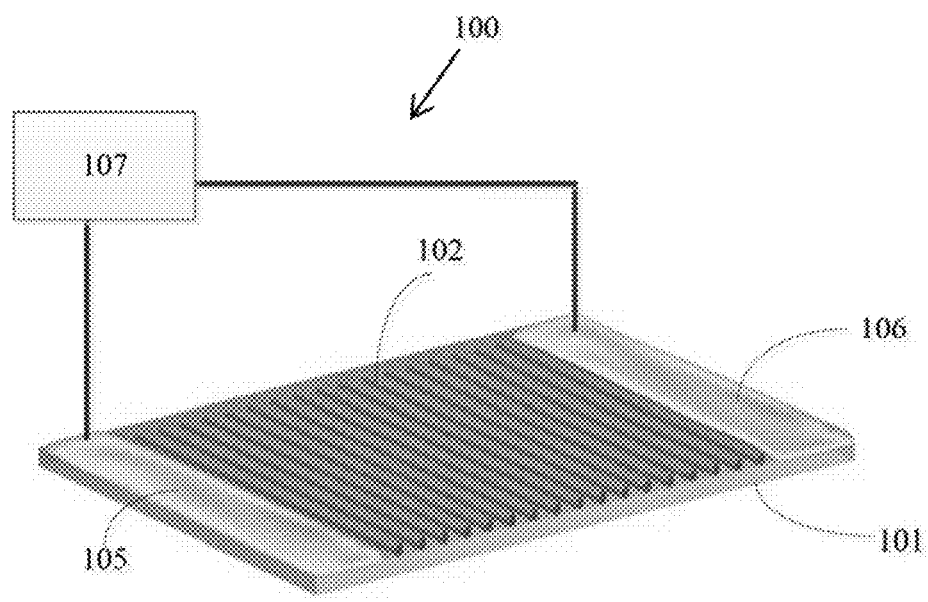
FIG. 1 is a structure schematic view of one embodiment of a flexible strain sensor.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
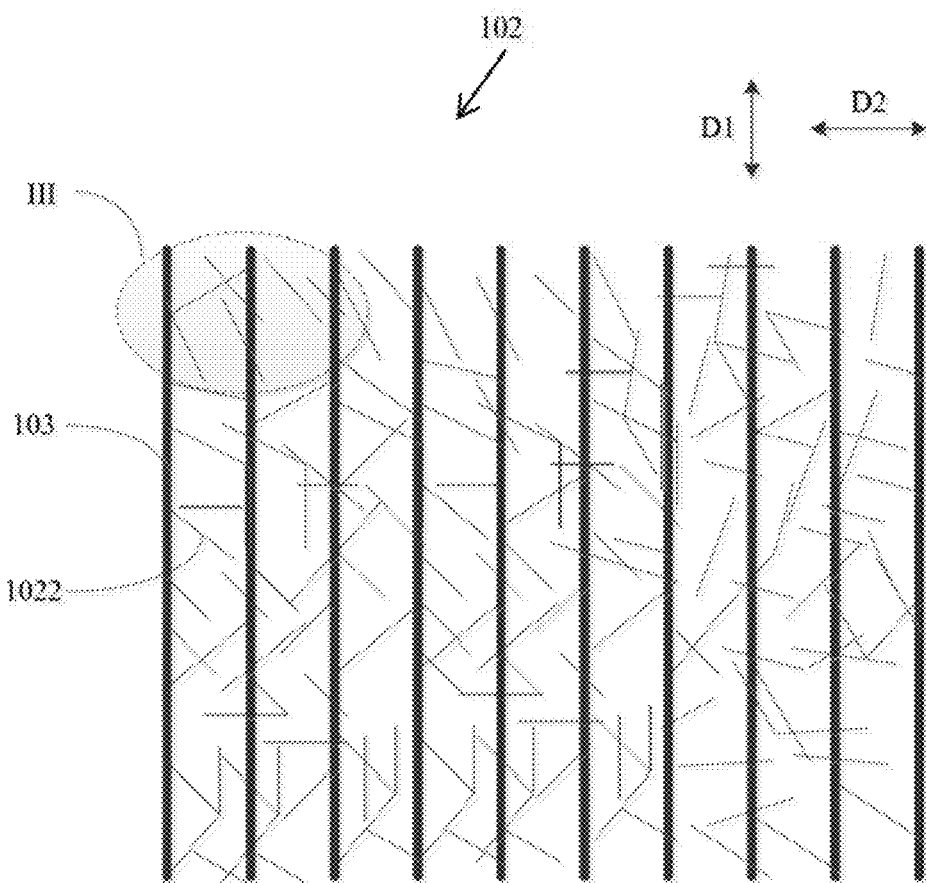
FIG. 2 is a structure schematic view of one embodiment of a carbon nanotube film.

Referring to FIGS. 1-2, one embodiment is described in relation to a flexible strain sensor 100. The flexible strain sensor 100 includes a substrate 101, a carbon nanotube film 102, a first electrode 105, a second electrode 106 and a detector 107. The substrate 101 and the carbon nanotube film 102 are combined with each other to form a composite structure. The carbon nanotube film 102 is joined to a surface of the substrate 101. The carbon nanotube film 102 can be stretched along a desired deformation direction. The first electrode 105 and the second electrode 106 are electrically coupled with the carbon nanotube film 102. The first electrode 105 and the second electrode 106 are separately located at two opposite ends of the carbon nanotube film 102 in the first direction. The detector 107 is configured to detect resistance of the carbon nanotube film 102, and is electrically coupled with the first electrode 105 and the second electrode 106.

The substrate 101 is configured to support the carbon nanotube film 102. A material of the substrate 101 is flexible and can be silicone, rubber or plastic. A thickness of the substrate 101 can be in a range from about 0.01 millimeters to about 1 millimeter. In one embodiment, the material of the substrate 101 is silicone.

The carbon nanotube film 102 can be joined to the substrate 101 by Van der Waals attractive forces. In one embodiment, the carbon nanotube film 102 is a super aligned carbon nanotube film. The super aligned carbon nanotube film is drawn from a carbon nanotube array, and then directly is spread on the surface of the substrate 101; after that, alcohol is used to soak the super aligned carbon nanotube film. After the alcohol volatizes, the super aligned carbon nanotube film and the substrate 101 combine tightly to form the composite structure including the substrate 101 and the carbon nanotube film 102.

Figure 3:
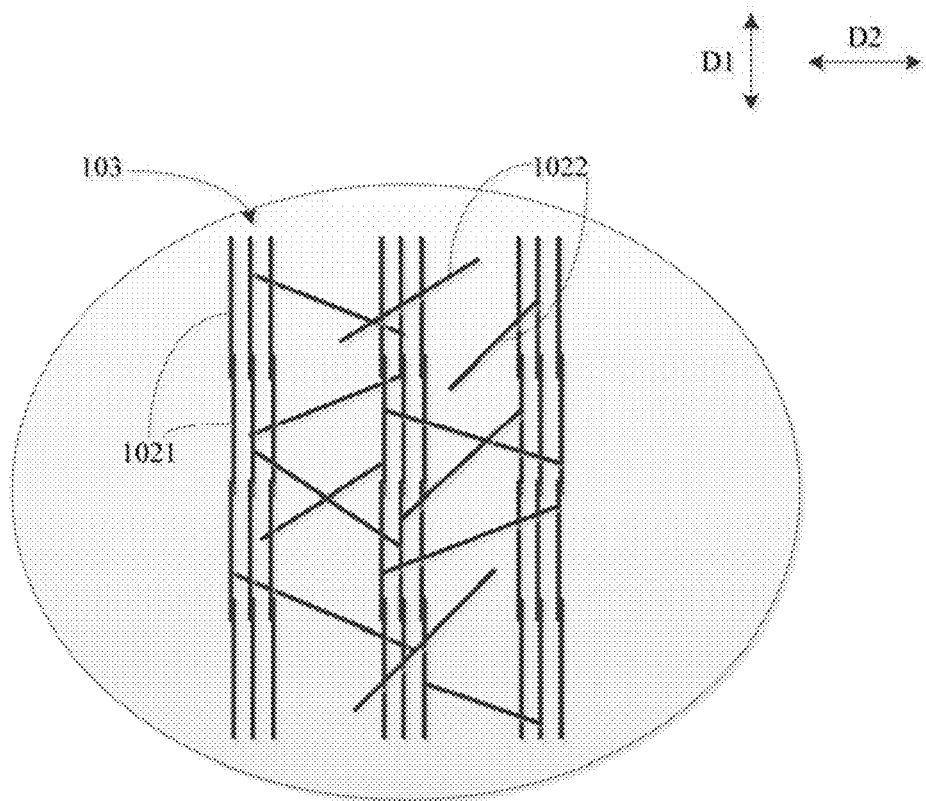
FIG. 3 is a magnified schematic view of part III.

Referring to FIGS. 2-3, the carbon nanotube film 102 includes a plurality of first carbon nanotubes 1021 and a plurality of second carbon nanotubes 1022. The quantity of the first carbon nanotubes 1021 is much larger than the quantity of the second carbon nanotubes 1022. The plurality of first carbon nanotubes 1021 are joined end to end to form a plurality of carbon nanotube strings 103. Each carbon nanotube string 103 includes a plurality of first carbon nanotubes 1021 joined end to end. The first carbon nanotubes 1021 in the carbon nanotube string 103 are substantially aligned along an axis of the carbon nanotube string 103, and attracted by van der Waals attractive forces therebetween. The carbon nanotube film 102 can include a plurality of carbon nanotube strings 103 located side by side. The carbon nanotube strings 103 are attracted by van der Waals attractive forces therebetween. The carbon nanotube strings 103 can be separated from each other. The carbon nanotube strings 103 are uniformly distributed in the carbon nanotube film 102 and substantially arranged along a first direction D1. The first direction D1 is perpendicular with the desired deformation direction of the carbon nanotube film 102. The second carbon nanotubes 1022 are located between adjacent carbon nanotube strings 103. The second carbon nanotubes 1022 contacts with at least two adjacent carbon nanotube strings 103 by van der Waals attractive forces therebetween. In some embodiments, most of the second carbon nanotubes 1022 are located side by side. The second carbon nanotubes 1022 can also be joined end to end. There is a certain distance between adjacent carbon nanotube strings 103. The distance between adjacent carbon nanotube strings 103 can be enlarged if a sufficient forces is applied on the carbon nanotube film 102.

The carbon nanotube strings 102 and the second carbon nanotubes 1022 form a grid like structure, thereby forming the carbon nanotube film 102 having a free-standing structure. The carbon nanotube film 102 having a free-standing structure means that the carbon nanotube film 102 can maintain a film structure if part of the carbon nanotube film 102 is located on a supporter and the structure of the carbon nanotube film 102 will not change. For example, when the carbon nanotube film 102 is placed on a frame or two separate supporters, part of the carbon nanotube film 102 which is not in contact with the frame or two separate supporting elements would be suspended between parts of the frame or between two supporters and yet will maintain film structure integrity.

The carbon nanotube film 102 can be stretched along a second direction D2. The second direction is parallel with the desired deformation direction. The second direction D2 is substantially perpendicular to the first direction D1. If the carbon nanotube film 102 is stretched along the second direction D2, the carbon nanotube film 102 is accordingly deformed along the second direction D2, thus, the distance between adjacent carbon nanotube strings 103 changes. Specifically, the distance between adjacent carbon nanotube strings 103 is increased with increased deformation of the carbon nanotube film 102 along the second direction D2. The capable deformation of the carbon nanotube film 102 along the second direction D2 can reach up to about 400% (e.g., the carbon nanotube film 10 can be stretched to about 400% of its original size). In the present embodiment, a distance between the adjacent carbon nanotube strings 103 located side by side can range from about 0 micrometers to about 50 micrometers. The distance between the adjacent carbon nanotube strings 103 gets larger along with the deformation increase of the carbon nanotube film 102.

A length and a thickness of the carbon nanotube film 102 can be varied. The width of the carbon nanotube film 102 is related to the size of a carbon nanotube array, the carbon nanotube film being drawn from the carbon nanotube array. A thickness of the carbon nanotube film 102 can be in a range from about 0.5 nanometers to about 1 millimeter. A diameter of the carbon nanotubes, including the first carbon nanotubes 1021 and the second carbon nanotubes 1022 in the carbon nanotube film 102, can be in a range from about 0.5 nanometers to about 50 nanometers. A length of the carbon nanotubes, including the first carbon nanotubes 1021 and the second carbon nanotubes 1022 in the carbon nanotube film 102, can be in a range from about 50 micrometers to about 5 millimeters.

The capable deformation of the carbon nanotube film 102 along the second direction D2 is related to the thickness and the density of the carbon nanotube film 102. The greater the thickness and the density of the carbon nanotube film 102, the larger the capable deformation of the carbon nanotube film 102 along the second direction D2. Further, the capable deformation of the carbon nanotube film 102 can also be related to the number of the second carbon nanotubes 1022 between the carbon nanotube strings 103. The greater the number of the second carbon nanotubes 1022 between the carbon nanotube strings 103, the greater the capable deformation of the carbon nanotube film 102 along the second direction D2. The capable deformation of the carbon nanotube film 102 along the second direction D2 can reach up to about 400%.

A light transmittance (transmitting ratio of visible light) of the carbon nanotube film 102 can be related to the thickness and the density of the carbon nanotube film 102. The larger the thickness and density of the carbon nanotube film 102 are, the lower the light transmittance of the carbon nanotube film 102 is. Further, the light transmittance of the carbon nanotube film 102 also can be related to the number of the second carbon nanotubes 1022 between the carbon nanotube strings 103 and the distance between the adjacent carbon nanotube strings 103. The larger the distance between the carbon nanotube strings 103 and the fewer the number of the second carbon nanotubes 1022 between the carbon nanotube strings 103, the higher the light transmittance of the carbon nanotube film 102. The light transmittance of the carbon nanotube film 102 can be in a range from about 60% to about 95%. In one embodiment, when the thickness of the carbon nanotube film 102 is about 50 nanometers, the light transmittance of the carbon nanotube film 102 before being stretched is in a range from about 67% to about 82%. If deformation of the carbon nanotube film 102 along the second direction D2 is 120%, the light transmittance of the carbon nanotube film 102 is in a range from about 84% to about 92%. Using green light with a wavelength of 550 nanometers as an example, green light transmittance of the carbon nanotube film 102 before being stretched is about 78%. If deformation of the carbon nanotube film 10 along the second direction D2 is about 120%, the green light transmittance of the carbon nanotube film 10 increases to about 89%. Because the carbon nanotube film has a higher light transmittance, if the substrate 101 is transparent, the flexible strain sensor 100 can be transparent. When the transparent flexible strain sensor 100 is used in cloth, the outward appearance of the cloth will not be affected.

The first electrode 105 and the second electrode 106 are separately located at two opposite ends of the carbon nanotube film 102. The first electrode 105 and the second electrode 106 can both be liner and oriented along a direction parallel with D1. A length of the first electrode 105 and the second electrode 106 is almost the same as a length of the carbon nanotube film along D1 direction. The first electrode 105 and the second electrode 106 are used to detect resistance of the composite structure of the carbon nanotube film 102 and the substrate 101. The first electrode 105 and the second electrode 106 are electrically coupled with the detector 107 by lead wire. When a deformation happens on the composite structure of the carbon nanotube film 102 and the substrate 101, the resistance of the composite structure changes, the detector 107 can detect the resistance change by the first electrode 105 and the second electrode 106 and show the resistance change.

Figure 4:
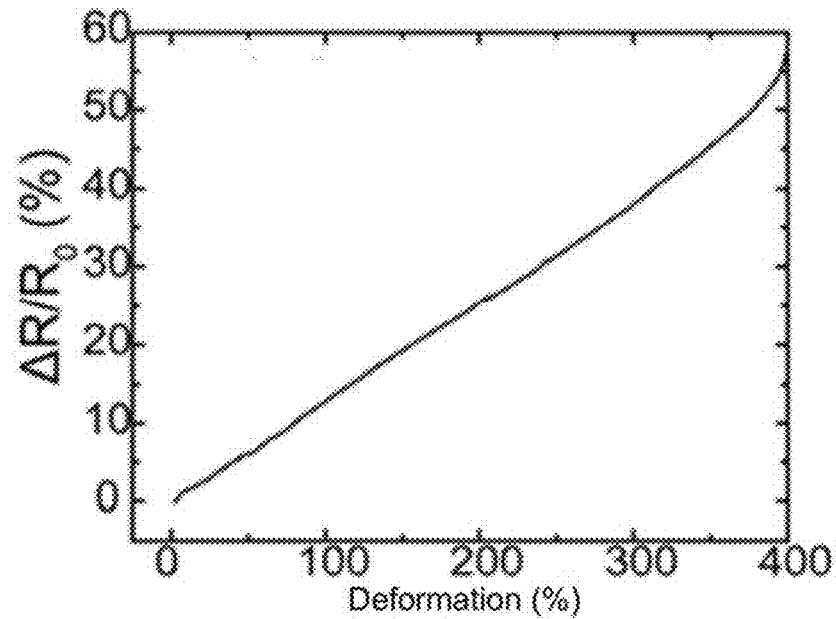
FIG. 4 is a graph showing a relationship between resistance change ($\Delta R/R_0$) and strain deformation of a composite structure in a flexible strain sensor of one embodiment.
Figure 5:
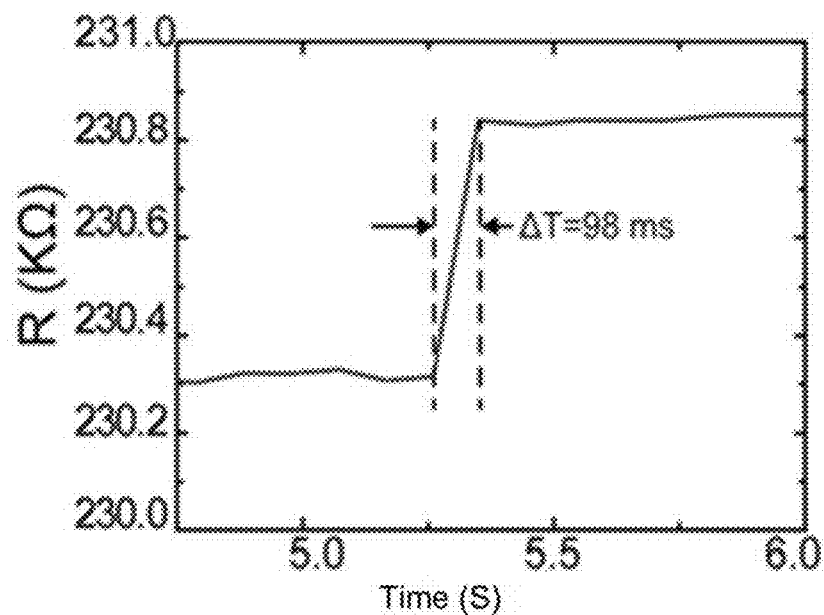
FIG. 5 is graph showing a resistance change reaction speed of a composite structure when a strain deformation happens on the composite structure.

The resistance of composite structure of the carbon nanotube film 102 and the substrate 101 along D2 direction is related with the capable deformation of the composite structure along D1 direction. Referring to FIG. 4, $\Delta R$ refers to resistance change of the composite structure, R refers to original resistance of the composite structure, and $\Delta R/R$ refers to a ratio between resistance change and original resistance. It can be seen from FIG. 4, if the resistance change of the composite structure is relative with the capable deformation of the composite structure. Moreover, the resistance change of the composite structure is reversible. The resistance of composite structure almost recovers its initial value after the 0 to 400% stretching cycle. The reversible resistance changes of the composite structure under the as high as 400% strain ensure them a widely sensing range when using as the flexible stain sensor 100. Referring to FIG. 5, when deformation happens on the flexible strain sensor 100, the resistance change can be detected in 98 ms. Thus, the flexible strain sensor 100 has a high sensitivity. The deformation value can be detected by the detector 107 by the resistance change detecting.

In use of the flexible strain sensor 100, it is coupled with an object, if deformation happens on the object, the flexible strain sensor 100 also is deformed, and the detector 107 of the flexible strain sensor 100 can detect the deformation value of the flexible strain sensor 100, therefore, the deformation of the object can be detected.

Figure 6:
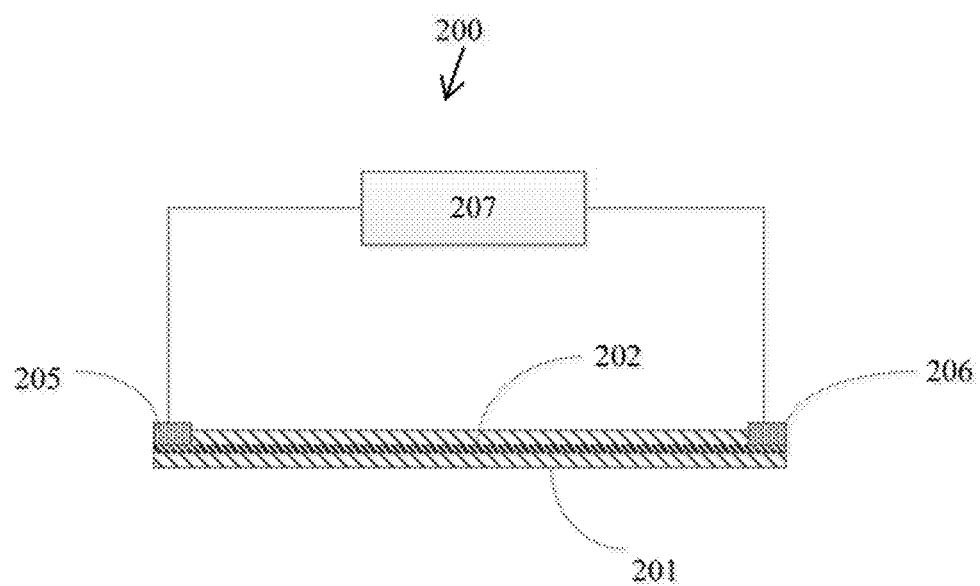
FIG. 6 is a structure schematic view of one embodiment of a flexible strain sensor.

Referring to FIG. 6, one embodiment is described in relation to a flexible strain sensor 200. The flexible strain sensor 200 includes a substrate 201, a carbon nanotube film 202, a first electrode 205, a second electrode 206 and a detector 207. The substrate 201 and the carbon nanotube film 202 are combined with each other to form a composite structure. The carbo nanotube film 202 is embedded in the substrate 201. The substrate 201 wraps the carbon nanotube film 202, and the carbon nanotube film 202 is not exposed out of the substrate 201. The first electrode 205 and the second electrode 206 are electrically coupled with the carbon nanotube film 202. The first electrode 205 and the second electrode 206 are separately located at two opposite ends of the carbon nanotube film 202. The first electrode 205 and the second electrode 206 are embedded in the substrate 201.

Other characteristics of the flexible strain sensor 200 are the same as the flexible strain sensor 100 disclosed above.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is to be viewed for identification purposes and not as a suggestion as to an order for the steps.

What is claimed is:

1. A flexible strain sensor comprising:
 a composite structure comprising a carbon nanotube film and a substrate combined with each other, the carbon nanotube film defining a desired deformation direction and comprising a plurality of first carbon nanotubes oriented along an orientation direction substantially perpendicular with the desired deformation direction, wherein the plurality of first carbon nanotubes are joined end to end with each other along their orientation direction, the plurality of first carbon nanotubes are joined end to end to form a plurality of carbon nanotube strings, the plurality of carbon nanotube strings are located side by side and oriented along a first direction, the first direction is perpendicular with the desired deformation direction;
 a first electrode and a second electrode, the first electrode and the second electrode separately located, one at each of the two opposite ends of the carbon nanotube film and electrically coupled with the carbon nanotube film; and
 a detector electrically connected with the first electrode and the second electrode.

2. The flexible strain sensor of claim 1, wherein the carbon nanotube film is joined to a surface of the substrate.

3. The flexible strain sensor of claim 2, wherein the carbon nanotube film is joined to the substrate by Van der Waals attractive forces.

4. The flexible strain sensor of claim 1, wherein the carbon nanotube film is embedded in the substrate.

5. The flexible strain sensor of claim 4, wherein the first electrode and the second electrode are embedded in the substrate.

6. The flexible strain sensor of claim 5, wherein a part of the first electrode is embedded in the substrate, and the other part of the first electrode is exposed; a part of the second electrode is embedded in the substrate, and the other part of the second electrode is exposed.

7. The flexible strain sensor of claim 1, wherein the carbon nanotube film comprises a plurality of second carbon nanotubes located between adjacent carbon nanotube strings, the plurality of second carbon nanotubes contact with at least two adjacent carbon nanotube strings by van der Waals attractive forces therebetween.

8. The flexible strain sensor of claim 7, wherein the plurality of carbon nanotube strings and the plurality of second carbon nanotubes form a grid like structure.

9. The flexible strain sensor of claim 1, wherein each of the plurality of carbon nanotube strings comprises the plurality of first carbon nanotubes joined end to end and oriented along an axial direction of the carbon nanotube string.

10. The flexible strain sensor of claim 1, wherein a cross section of the carbon nanotube string comprises more than one first carbon nanotube.

11. The flexible strain sensor of claim 1, wherein a distance between adjacent carbon nanotube strings changes along with a deformation of the carbon nanotube film.

12. The flexible strain sensor of claim 1, wherein a distance between the adjacent carbon nanotube strings ranges from about 0 micrometers to about 50 micrometers.

13. The flexible strain sensor of claim 1, wherein a thickness of the carbon nanotube film ranges from about 0.5 nanometers to about 1 millimeter.

14. The flexible strain sensor of claim 1, wherein a resistance change of the composite structure is reversible when a deformation of the composite structure changes from 0 to 400%.

15. The flexible strain sensor of claim 14, wherein when the deformation of the composite structure happens, the resistance change of the composite structure is finished in 98 ms.

16. A flexible strain sensor comprising:
 a composite structure comprising a carbon nanotube film and a substrate combined with each other, the carbon nanotube film comprising a plurality of first carbon nanotubes oriented along an orientation direction, wherein the plurality of first carbon nanotubes are joined end to end with each other along their orientation direction, the carbon nanotube film is configured to be stretched along a direction perpendicular with the orientation direction, the plurality of first carbon nanotubes are joined end to end to form a plurality of carbon nanotube strings, the plurality of carbon nanotube strings are located side by side and oriented along a first direction, the first direction is perpendicular with the desired deformation direction;

a first electrode and a second electrode, the first electrode and the second electrode separately located, one at each of the two opposite ends of the carbon nanotube film and electrically coupled with the carbon nanotube film, wherein the first electrode and the second electrode is configured to detect a resistance of the composite structure.

* * * * *